(12) United States Patent
Schowengerdt et al.

(10) Patent No.: US 11,332,407 B2
(45) Date of Patent: May 17, 2022

(54) METHODS AND SYSTEMS FOR FABRICATION OF SHAPED FIBER ELEMENTS USING LASER ABLATION

(71) Applicant: Magic Leap, Inc., Plantation, FL (US)

(72) Inventors: Brian T. Schowengerdt, Seattle, WA (US); Mathew D. Watson, Bellevue, WA (US); Charles David Melville, Camano Island, WA (US); An-Shyang Chu, Bellevue, WA (US); Timothy Mark Dalrymple, Gainesville, FL (US); Vaibhav Mathur, Weston, FL (US); Alejandro Lopez, Pembroke Pines, FL (US); Aaron Mark Schuelke, Coral Springs, FL (US)

(73) Assignee: Magic Leap, Inc., Plantation, FL (US)

(*) Notice: Subject to any disclaimer, the term of this patent is extended or adjusted under 35 U.S.C. 154(b) by 18 days.

(21) Appl. No.: 16/905,713

(22) Filed: Jun. 18, 2020

(65) Prior Publication Data

US 2020/0385308 A1    Dec. 10, 2020

Related U.S. Application Data

(62) Division of application No. 15/851,049, filed on Dec. 21, 2017, now Pat. No. 10,723,653.
(Continued)

(51) Int. Cl.
*C03C 25/68* (2006.01)
*C03C 25/6208* (2018.01)

(52) U.S. Cl.
CPC .......... *C03C 25/68* (2013.01); *C03C 25/6208* (2018.01); *C03C 2217/00* (2013.01)

(58) Field of Classification Search
None
See application file for complete search history.

(56) References Cited

U.S. PATENT DOCUMENTS

| 4,049,413 A | 9/1977 | French |
| 5,919,607 A | 7/1999 | Lawandy |

(Continued)

FOREIGN PATENT DOCUMENTS

| CN | 1761549 A | 4/2006 |
| CN | 103348450 A | 10/2013 |

(Continued)

OTHER PUBLICATIONS

EP17883235.8, "Extended European Search Report", dated Jan. 22, 2020, 8 pages.
(Continued)

*Primary Examiner* — Lisa L Herring
(74) *Attorney, Agent, or Firm* — Kilpatrick Townsend & Stockton LLP (57) ABSTRACT

A method of fabricating a variable diameter fiber includes providing a fiber optic cable comprising a cladding region, a fiber core, and a plurality of sacrificial regions disposed in the cladding region and focusing a laser beam at a series of predetermined locations inside the fiber optic cable. The method also includes creating a series of damage sites associated with the series of predetermined locations, wherein the series of damage sites define a variable diameter profile and a latticework in the cladding region of the fiber optic cable. The method further includes exposing the fiber optic cable to an etchant solution, preferentially etching the series of damage sites, and separating peripheral portions of the fiber optic cable to release the variable diameter fiber.

11 Claims, 9 Drawing Sheets

Related U.S. Application Data (60) Provisional application No. 62/438,408, filed on Dec. 22, 2016.

(56) References Cited

U.S. PATENT DOCUMENTS

| | | |
|---|---|---|
| 6,509,547 B1 | 1/2003 | Bernstein et al. |
| 8,655,117 B2 | 2/2014 | Donlagic et al. |
| 10,723,653 B2 | 7/2020 | Schowengerdt et al. |
| 2001/0008077 A1 | 7/2001 | Berkey |
| 2008/0297912 A1 | 12/2008 | Baldwin |
| 2010/0303416 A1 | 12/2010 | Danley et al. |
| 2012/0051692 A1 | 3/2012 | Seo et al. |
| 2012/0228259 A1 | 9/2012 | Donlagic et al. |
| 2014/0078505 A1 | 3/2014 | Lai et al. |
| 2018/0179106 A1 | 6/2018 | Schowengerdt et al. |
| 2018/0299614 A1 | 10/2018 | Schwagmeier et al. |

FOREIGN PATENT DOCUMENTS

| | | |
|---|---|---|
| CN | 204116658 U | 1/2015 |
| CN | 105846302 A | 8/2016 |
| CN | 106029286 A | 10/2016 |
| CN | 106132627 A | 11/2016 |
| JP | 07333453 A | 12/1995 |
| JP | 2005187242 A | 7/2005 |
| JP | 2010142837 A | 7/2010 |
| WO | 2011067908 A1 | 6/2011 |
| WO | 2016202328 A1 | 12/2016 |
| WO | 2018119285 A1 | 6/2018 |

OTHER PUBLICATIONS

PCT/US2017/067961, "International Preliminary Report on Patentability", dated Jul. 4, 2019, 6 pages.

PCT/US2017/067961, "International Search Report and Written Opinion", dated Mar. 20, 2018, 7 pages.

Application No. CN201780079414.X , English Translation and Office Action, dated Jun. 23, 2021, 18 pages.

IN201947020804 , "First Examination Report", dated Sep. 7, 2021, 8 pages.

Application No. JP2019-533141 , English Translation and Office Action, dated Sep. 3, 2021, 6 pages.

AU2017382875, "First Examination Report", dated Feb. 11, 2022, 3 pages.

Application No. IL267394, Office Action, dated Jan. 17, 2022, 4 pages.

METHODS AND SYSTEMS FOR FABRICATION OF SHAPED FIBER ELEMENTS USING LASER ABLATION

CROSS-REFERENCES TO RELATED APPLICATIONS

This application is a divisional of U.S. patent application Ser. No. 15/851,049, filed on Dec. 21, 2017, U.S. Pat. No. 10,723,653, issued on Jul. 28, 2020, entitled "METHODS AND SYSTEMS FOR FABRICATION OF SHAPED FIBER ELEMENTS USING LASER ABLATION," which is a non-provisional of and claims the benefit of and priority to U.S. Provisional Patent Application No. 62/438,408, filed on Dec. 22, 2016, entitled "METHODS AND SYSTEMS FOR FABRICATION OF SHAPED FIBER ELEMENTS USING LASER ABLATION," the disclosures of which are hereby incorporated by reference in their entirety for all purposes.

The disclosures of the following U.S. patent applications are hereby incorporated by reference in their entirety for all purposes:

U.S. patent application Ser. No. 15/851,005, filed Dec. 21, 2017, U.S. Pat. No. 10,254,483, issued on Apr. 9, 2019 entitled "SHAPED FIBER ELEMENTS FOR SCANNING FIBER DISPLAYS;" and U.S. patent application Ser. No. 15/851,317, filed on Dec. 21, 2017, U.S. Pat. No. 10,437,048, issued on Oct. 8, 2019, entitled "METHODS AND SYSTEMS FOR MULTI-ELEMENT LINKAGE FOR FIBER SCANNING DISPLAY."

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems for fabrication of shaped fiber optic cables. More particularly, embodiments of the present invention provide methods and systems for fabricating fibers with tapered and other predetermined profiles. The invention is applicable to a variety of applications in computer vision and image display systems.

According to an embodiment of the present invention, a method of fabricating a variable diameter fiber is provided. The method includes providing a fiber optic cable, focusing a laser beam at a predetermined location inside the fiber optic cable, and creating a damage site at the predetermined location. The method also includes focusing the laser beam at a series of additional predetermined locations inside the fiber optic cable and creating a plurality of additional damage sites at the additional predetermined locations. The damage site and the additional damage sites define a variable diameter profile. The method further includes exposing the fiber optic cable to an etchant solution, preferentially etching the damage site and the plurality of additional damage sites, and separating a portion of the fiber optic cable to release the variable diameter fiber.

As an example, the fiber optic cable can include a cladding region and a plurality of sacrificial regions disposed in the cladding region. The plurality of sacrificial regions can include a material having a higher etch rate than the cladding region. In another example, the plurality of sacrificial regions can include one or more air cavities. Moreover, regions of the fiber optic cable can be characterized by a predetermined etch rate and the damage site and the plurality of additional damage sites can be characterized by a higher etch rate than the predetermined etch rate. In this embodiment, an etch time associated with removal of the damage site and the plurality of additional damage sites is less than an etch time associated with removal of the regions of the fiber optic cable.

According to another embodiment of the present invention, a method of fabricating a variable diameter fiber is provided. The method includes providing a fiber optic cable comprising a cladding region, a fiber core, and a plurality of sacrificial regions disposed in the cladding region. The method also includes focusing a laser beam at a series of predetermined locations inside the fiber optic cable and creating a series of damage sites associated with the series of predetermined locations. The series of damage sites define a variable diameter profile and a latticework in the cladding region of the fiber optic cable. The method further includes exposing the fiber optic cable to an etchant solution, preferentially etching the series of damage sites, and separating peripheral portions of the fiber optic cable to release the variable diameter fiber.

Numerous benefits are achieved by way of the present invention over conventional techniques. For example, embodiments of the present invention provide methods and systems that can be used to fabricate fibers that can be integrated into fiber scanning display systems. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems for fabricating elements for fiber scanning display systems. As described herein, embodiments of the present invention enable fabrication of optical elements using laser ablation that can be incorporated into fiber scanning display systems. In particular, cantilevered emission fibers with fiber profiles sculpted by laser ablation are fabricated using the techniques described herein.

In this specification, discussion is provided in relation to laser ablation and damage sites, but this is not intended to limit embodiments of the present invention and other terms can be used to describe the processes discussed herein, including laser modification, laser alteration, modified sites, altered sites, or the like. The terms ablation and damage are intended to include physical processes in which a focused laser spot changes or modifies the composition or other material properties of the material of interest (e.g., fused silica) such that the etchant (examples include HF or KOH) will impart a higher etch rate relative to the unmodified material. Thus, embodiments of the present invention do not require the removal of material and the use of the term ablation is not intended to require material removal. Accordingly, embodiments of the present invention include a variety of mechanisms, including, for example, heating, two-photon interactions, and the like, that can change the material properties of fiber optic materials. Such changes in the material properties do not require material removal in order to create a lattice of passages through which the etchant, for example, an aqueous etchant, can move through the cladding region and leave behind a shaped fused silica fiber and these processes are included within the scope of the laser-assisted etching processes described herein.

As described herein, a series of substantially contiguous damage sites are created inside the cladding of a fiber optic cable. These damage sites enable preferential etching along the damage sites as the etchant effectively wicks along the series of damage sites to create predetermined fiber shapes that are desired for specific applications. Tapered fiber profiles are used as examples herein, but the present invention is not limited to these particular shapes.

Figure 1A:
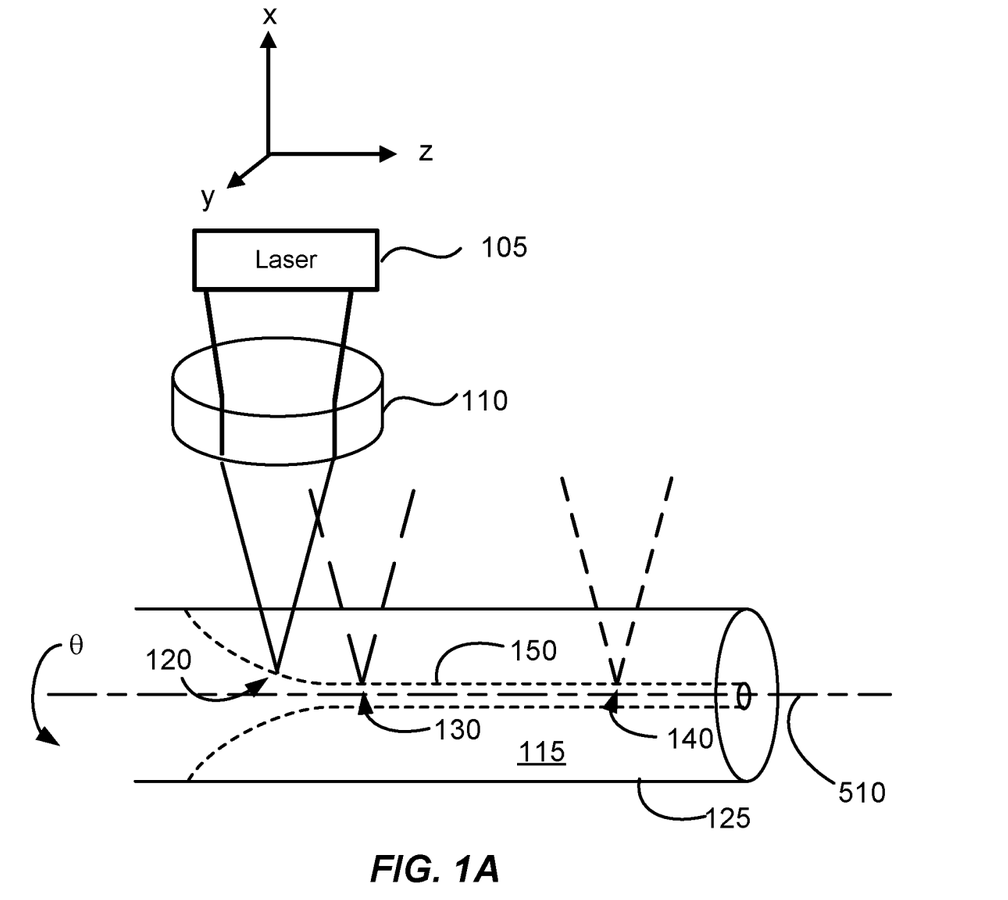
FIG. 1A is a simplified side view of a fiber optic cable and laser ablation beams according to an embodiment of the present invention.

FIG. 1A is a simplified side view of a fiber optic cable and laser ablation beams according to an embodiment of the present invention. A laser beam emitted by laser 105, which can be a femtosecond laser, is provided and propagates towards lens 110, which focuses the laser beam to a focus spot 120 inside the cladding 115 (also referred to as an outer region) of optical fiber 125. Focusing of the laser beam at the focus spot results in creation of a damage site at the focus spot. By rotating the fiber around the longitudinal axis 510 (e.g., the z-axis) of the fiber (illustrated by rotation angle θ in FIG. 1A), which is aligned with the fiber core, a series of damage sites can be created at a given radial distance.

Movement of the laser beam, and associated optical elements, is illustrated in FIG. 1A as the laser beam (e.g., from a femtosecond laser) is moved longitudinally to a second location such that a second focus spot 130 is formed at a greater distance from the surface of the fiber. Upon rotation of the fiber around the longitudinal axis, a series of damage sites are created that have a smaller radial distance from the fiber core than the series of damage sites associated with focus spot 120. A third longitudinal position is also illustrated in FIG. 1A, forming third focus spot 140. Using this process, a series 150 of damage sites, illustrated by a dashed profile that is tapered in this embodiment, are created that are substantially continuous. Thus, embodiments of the present invention provide methods and systems in which a laser machining technique is used to produce a rotationally symmetric tapered optical fiber tip. By controlling the rotation around the longitudinal axis and translation in the x and y directions orthogonal to the longitudinal (i.e., z) axis (e.g., with submicron precision), the fiber shape can be tapered or shaped to other predetermined shapes.

In some embodiments, the lens is moved to adjust the position of the focused spot, whereas in other embodiments, the focal power of the lens can be adjusted so the focused spot moves while the lens remains in substantially the same position. The use of the term substantially is used because focal power changes often result from moving elements inside the lens (e.g. a camera zoom lens). In yet other embodiments, the laser or elements of the laser system (including optical elements) can be translated to move the laser closer to or farther away from the fiber (i.e., adjusting the laser beam as a function of position from the focal spot to the core of the fiber optic cable.

As described below, an etching process can be used to preferentially etch along the series of damage sites, forming a tapered fiber profile in the embodiment illustrated in FIG. 1 and separating the portion of the fiber cladding at radial distances greater than the series of damage sites.

Figure 1B:
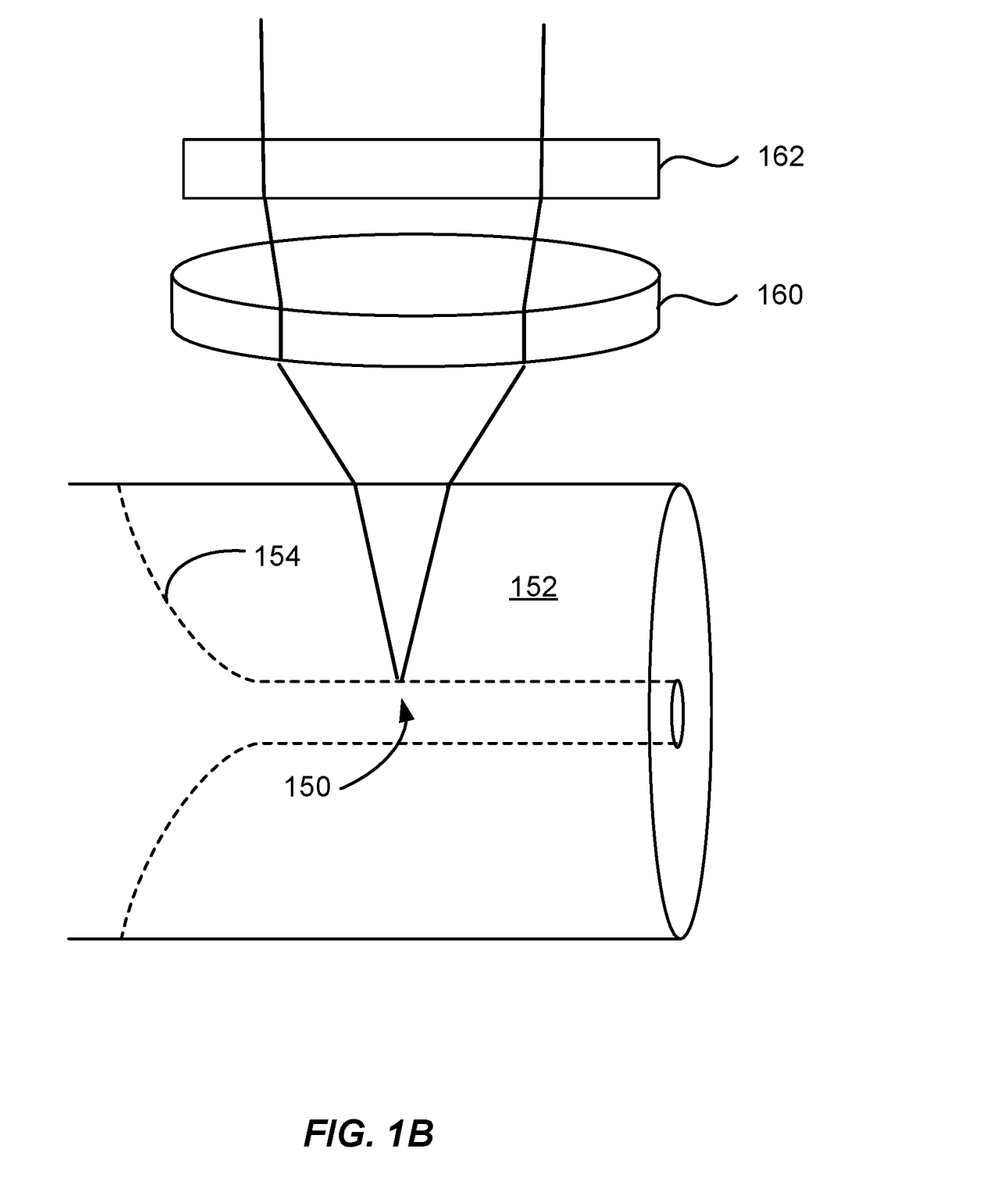
FIG. 1B is a simplified side view of a fiber optic cable and laser ablation beams with astigmatic correction according to an embodiment of the present invention.

FIG. 1B is a simplified side view of a fiber optic cable and laser ablation beams with astigmatic correction according to an embodiment of the present invention. As the light propagates into the fiber toward the fiber core, the fiber acts as a cylindrical lens in the direction extending into the figure. In the plane of the figure, the fiber does not introduce any focusing effect. The cylindrical lensing introduced by the fiber may adversely impact the size of the focus point 150 at which damage is created. As the focus point moves laterally, the series of damage sites 154 are created. In FIG. 6, in addition to focusing lens 160, an astigmatic lens 162 is incorporated in the optical path along which the laser beam propagates. As an example, a cylindrical lens could be used as astigmatic lens 162 to introduce correction in the plane extending into the figure to compensate for focusing by the fiber.

In some implementations, the astigmatic lens 162 and/or the focusing lens 160 have variable optical parameters so that the amount of astigmatism introduced and/or the focal length can be adjusted during operation of the system.

Accordingly, the wavefront prior to incidence on the fiber optic cable, includes an astigmatic correction that compensates for the cylindrical lens behavior of the fiber optic cable. Using the astigmatic lens 162, the focus point 150 in the cladding 152 of the fiber can approach a diffraction limited spot size, improving the localization of the damage sites. Another way to consider the optical properties of the beam resulting from use of the focusing lens 160 and the astigmatic lens 162 is that the wavefront propagating in the cladding is a uniform, converging beam able to form a diffraction limited spot at the damage site.

In some embodiments, the separate lenses can be combined into a single lens, which may be a multiple element compound lens, that both focuses the laser light into the fiber and provides astigmatic pre-correction to compensate for the cylindrical focusing occurring in the fiber.

A beam having a spherical wavefront converges to a diffraction limited focus inside the fiber. In implementations in which only focus lens 160 is used, then the cladding introduces astigmatism that makes the wavefront significantly different from a sphere. Hence, some embodiments utilize astigmatic lens 162 to introduce astigmatism of the opposite sign to counteract the astigmatism introduced by the cladding. The combination of astigmatic lens 162 and the cladding produces a spherical wavefront inside the fiber. A lens design program (e.g., Zemax or Code V) may be used to choose the correct amount of astigmatic power for astigmatic lens 162.

Figure 1C:
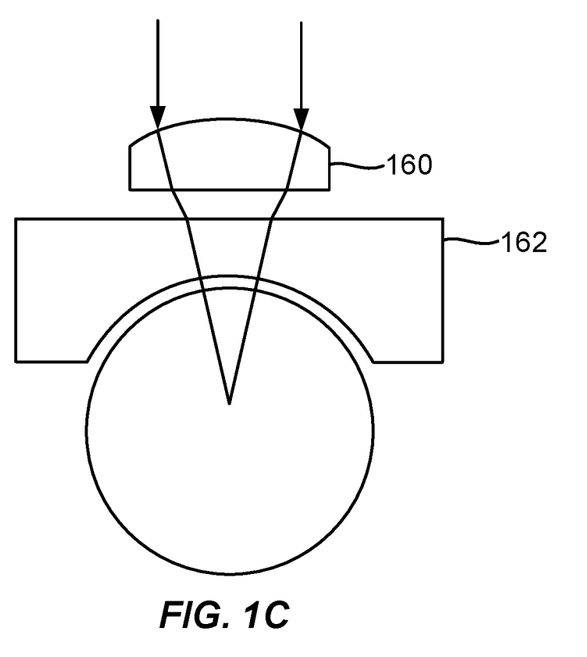
FIG. 1C is a simplified end view of a fiber optic cable and a laser ablation beam with astigmatic correction according to an embodiment of the present invention.

FIG. 1C is a simplified end view of a fiber optic cable and a laser ablation beam with astigmatic correction according to an embodiment of the present invention. In the limit where the gap between astigmatic lens 162 and the cladding of the fiber goes to zero, the astigmatic correction is perfect for all focus spot locations, whether from moving lens 160 with respect to 162 and the fiber or changing the focal power of lens 160 without moving the lens. In practice, a small gap allows for positioning errors. It will be appreciated that a lens design program allows one skilled in the art to optimize the gap given the desired focal spot range and the convergence angle (NA) of the focal spot.

Figure 1D:
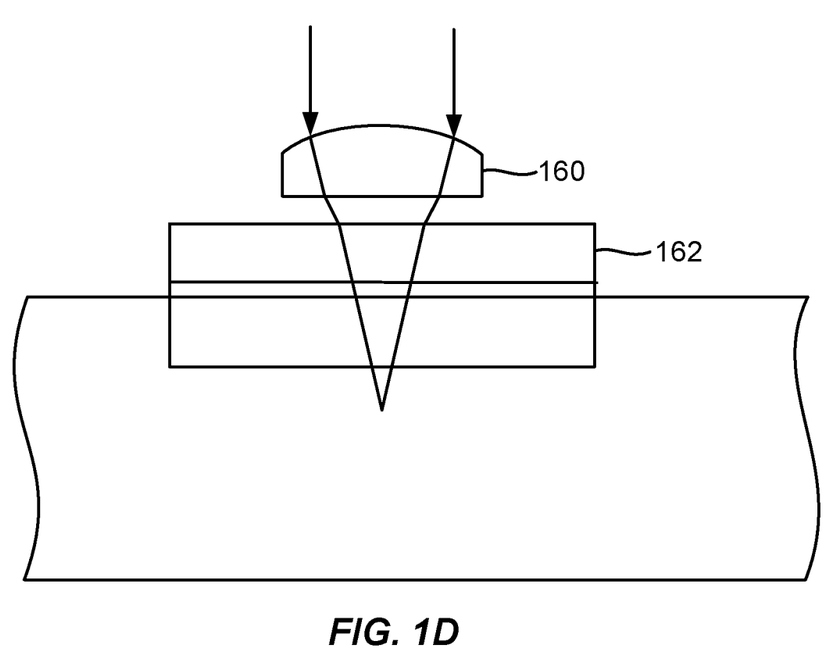
FIG. 1D is a simplified side view of a fiber optic cable and a laser ablation beam with an index matching material according to an embodiment of the present invention.

FIG. 1D is a simplified side view of a fiber optic cable and a laser ablation beam with an index matching material according to an embodiment of the present invention. As illustrated in FIG. 1D, the gap between the astigmatic lens 162 and the fiber optic cable is filled with an index matching material (e.g., a fluid) that removes the astigmatic power of both the cladding and astigmatic lens 162. This design allows the spherical wave near the top of astigmatic lens 162 to pass into the fiber without refraction. This method is effective although index matching materials may introduce optical properties, such as absorption of the laser ablation beam. One of ordinary skill in the art would recognize many variations, modifications, and alternatives.

In alternative embodiments, in addition to astigmatic correction, other modifications of the wavefront of the optical beam can be introduced, for example, formation of a linear focus region extending along the longitudinal direction. One of ordinary skill in the art would recognize many variations, modifications, and alternatives.

Figure 2:
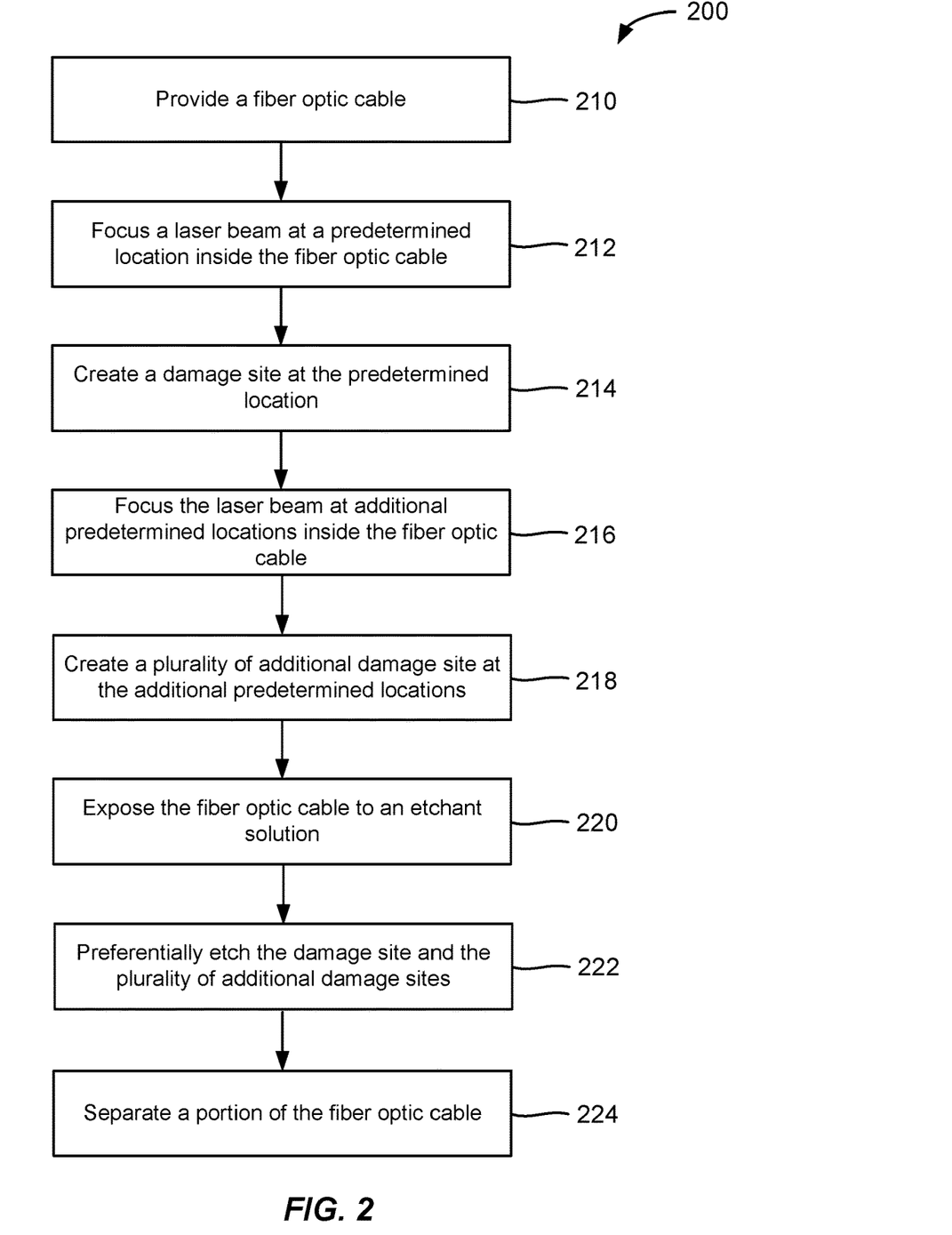
FIG. 2 is a simplified flowchart illustrating a method of fabricating a variable diameter fiber according to an embodiment of the present invention.

FIG. 2 is a simplified flowchart illustrating a method of fabricating a variable diameter fiber according to an embodiment of the present invention. The method 200 includes providing a fiber optic cable (210), focusing a laser beam at a predetermined location inside the fiber optic cable (212), and creating a damage site at the predetermined location (214).

The method also includes focusing the laser beam at a series of additional predetermined locations inside the fiber optic cable (216) and creating a plurality of additional damage sites at the additional predetermined locations (218). In an embodiment, the damage site and the additional damage sites define a tapered profile that has a decreasing diameter as a function of longitudinal distance toward the fiber emission tip, thereby producing a tapered fiber.

The method further includes exposing the fiber optic cable to an etchant solution (220), preferentially etching the damage site and the plurality of additional damage sites (222), and separating a portion of the fiber optic cable to release the variable diameter fiber (224). After the preferential etching process, the portion of the cladding surrounding the variable diameter fiber is able to be removed to enable the variable diameter fiber to be incorporated into fiber scanning display systems and the like.

According to an embodiment of the present invention, focusing of light by the fiber as the laser beam propagates to the focus point/damage site and the plurality of additional damage sites is compensated for by using an astigmatic lens that introduces an amount of focusing equal and opposite to the focusing that occurs as the laser beam propagates through the fiber. Since the damage sites will be positioned at varying depths in the fiber cladding, that is, varying distances from the core of the fiber, the correction lens can be adjusted as the laser traverses through different radial distances in the cladding of the fiber in some implementations.

Figure 3:
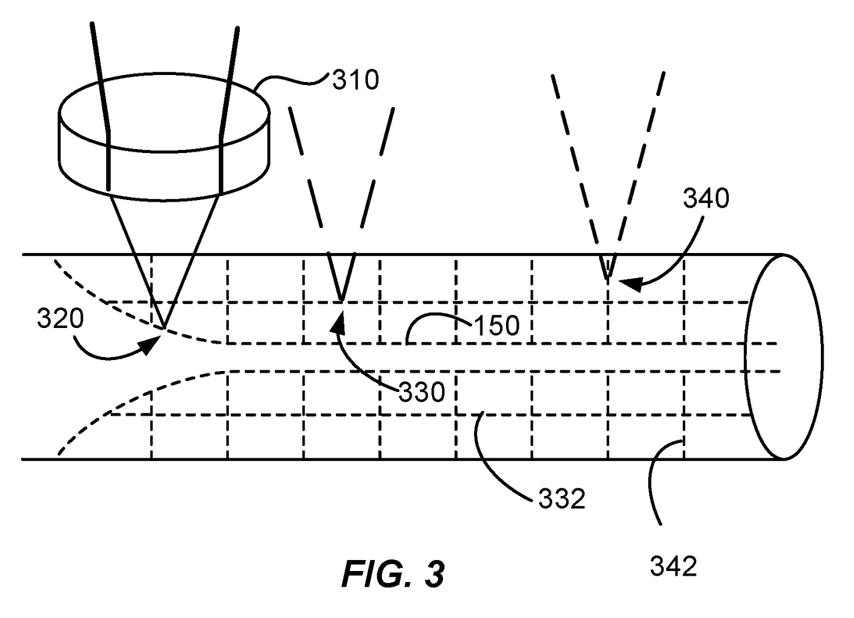
FIG. 3 is a simplified side view of a fiber optic cable and laser ablation beams forming a latticework according to an embodiment of the present invention.
Figure 4:
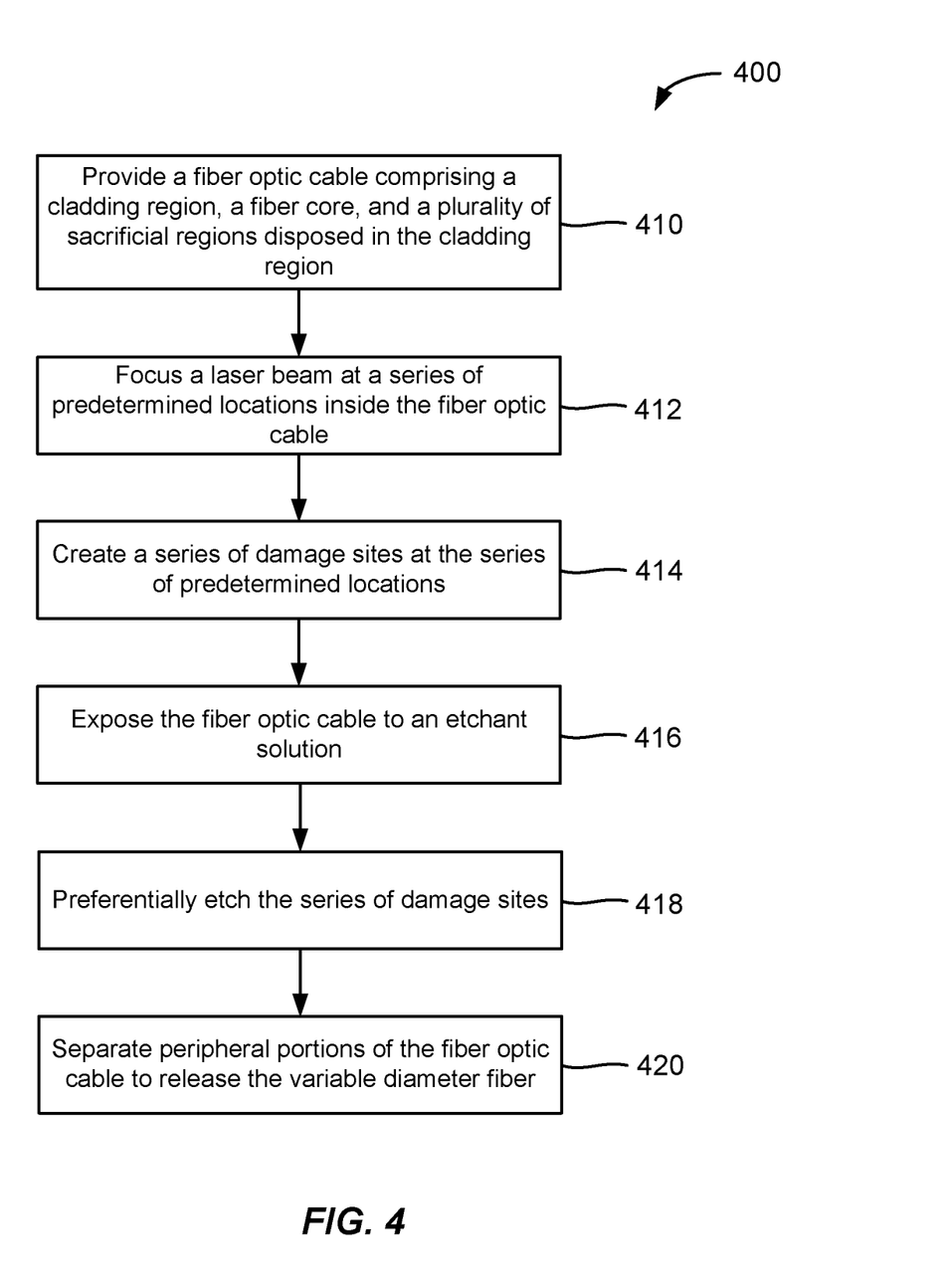
FIG. 4 is a simplified flowchart illustrating a method of fabricating a tapered fiber according to an embodiment of the present invention.

As described in addition detail with respect to FIGS. 3 and 4, creating the plurality of additional damage sites at the additional predetermined locations can include forming a latticework of damage sites in the cladding of the fiber optic cable. For example, in some embodiments, a plurality of radial vias can pass through the cladding region toward the fiber core. The focus point of the laser beam can be controlled so that initially, a first portion of the plurality of additional damage sites are created adjacent the fiber core (i.e., at small radial distances from the fiber core) and subsequently, a second portion of the plurality of additional damage sites are created at farther distances from the fiber core (i.e., at larger radial distances up to the diameter of the cladding region). This technique provides damage free materials through which the laser beam propagates, reducing or preventing degradation in beam quality.

Figure 5:
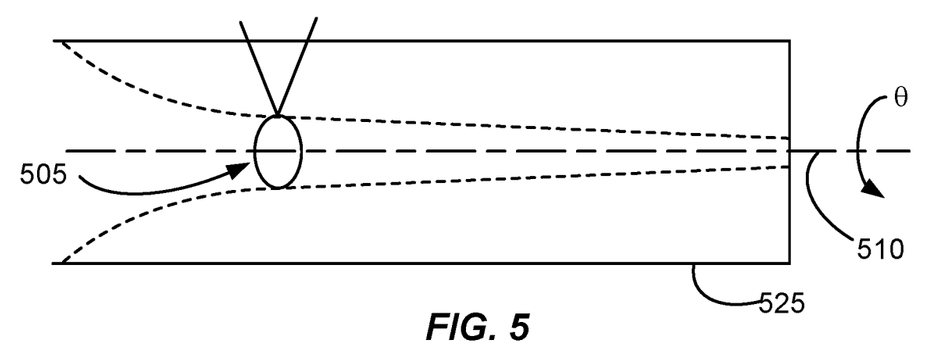
FIG. 5 is a simplified side view of a fiber optic cable and a laser ablation beam forming a tapered light emission tip according to an embodiment of the present invention.

As discussed in additional detail with respect to FIG. 5, the fiber core is characterized by a longitudinal axis and the method can include rotating the fiber around the longitudinal axis while the plurality of additional damage sites are created at the additional predetermined locations.

Figure 8:
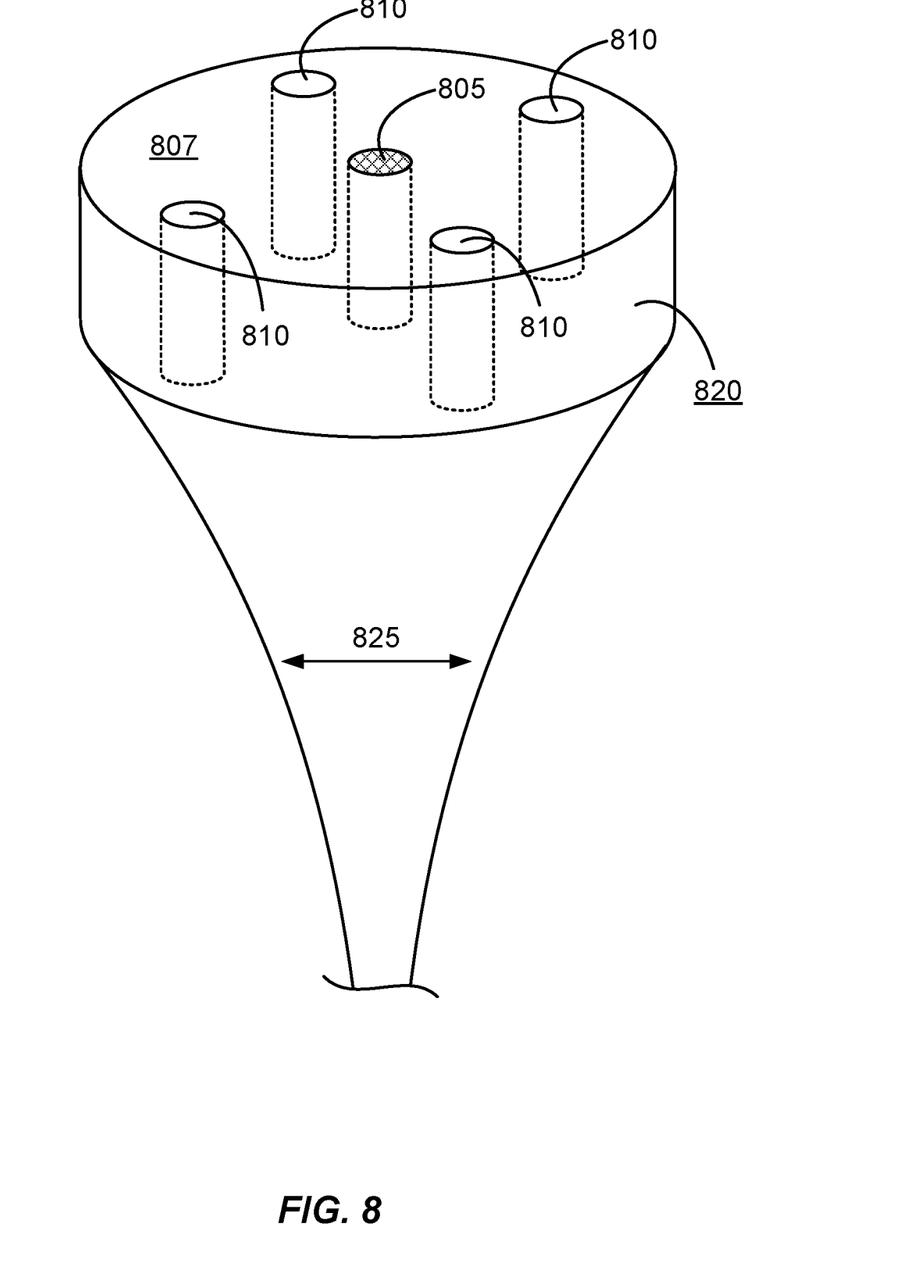
FIG. 8 is a simplified perspective view illustrating drawing of a fiber preform with sacrificial regions according to an embodiment of the present invention.

As discussed in addition detail with respect to FIG. 8, the fiber optic cable can include a cladding region and a plurality of sacrificial regions disposed in the cladding region. The plurality of sacrificial regions can include a material having a higher etch rate than the cladding region or may be air cavities through which the etchant can flow.

It should be appreciated that the specific steps illustrated in FIG. 2 provide a particular method of fabricating a variable diameter fiber according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

As discussed in relation to FIG. 2, preferential etching occurs along the series of damage sites. In some implementations, the time required for the etchant to move through these relatively small passages can extend the manufacturing time. Accordingly, embodiments of the present invention can provide and utilize a latticework of damage points that extend radially and longitudinally throughout the fiber to decrease etch times. As discussed in relation to FIG. 3, a skeletal structure can be created that enables high concentration etchant to have many points of ingress into the fiber and to quickly remove predetermined sections of the fiber cladding and to create a desired variable diameter shape such as a tapered shape. In some implementations, the predetermined sections are defined by the structure associated with the latticework of damage sites and can be removed as sections. As sections of the latticework are removed, high volume areas for additional inflow of etchant are provided, which increases the etch rate in these sections. One of ordinary skill in the art would recognize many variations, modifications, and alternatives.

FIG. 3 is a simplified side view of a fiber optic cable and laser ablation beams forming a latticework according to an embodiment of the present invention. As discussed above, in some implementations, the rate at which etchant wicks into the structure along the series of damage locations can be less than desired. Accordingly, the embodiment of the present invention illustrated in FIG. 3 utilizes the laser to create additional damage sites defining a latticework. In addition to the formation of series of damage sites 150, laser irradiation illustrated by the laser beam is utilized to form a series of damage sites 332 running along the longitudinal direction and laser irradiation illustrated by the laser beam is utilized to form a series of damage sites 342 running along the lateral direction. The laterally aligned damage sites can also be referred to as vias. This latticework of damage sites enables the etchant to more quickly permeate the cladding of the fiber and decrease the etch time, which can be considered as an increase in the effective etch rate. Lens 310 can incorporate astigmatic correction as discussed in relation to FIG. 1B.

As illustrated in FIG. 3, the variable diameter fiber shape can be defined along with the latticework. Through control of the focusing depth and the use of rotation of the fiber, the laser can be scanned longitudinally, defining the variable diameter shape, the vias, and the longitudinally aligned damage sites in a given plane. The laser is then moved longitudinally, forming the appropriate damage sites in each longitudinal plane, which when taken together, form both the variable diameter fiber shape and the latticework. It should be noted that vias can be created by stopping the rotation of the fiber and drilling into the fiber at a fixed longitudinal position. Such drilling may proceed from the deepest point (i.e. the region adjacent the core) to the region adjacent the outer sides of the cladding layer. In this way, the damage sites and the associated latticework and variable diameter patterns can be created at the deepest portions of the fiber first and move out over time so that the damage sites/defects don't impair the optical beam quality as the final damage sites are formed.

FIG. 4 is a simplified flowchart illustrating a method of fabricating a variable diameter fiber according to an embodiment of the present invention. The method 400 includes providing a fiber optic cable comprising a cladding region, a fiber core, and a plurality of sacrificial regions disposed in the cladding region (410). As illustrated in FIG. 8, the plurality of sacrificial regions can be fabricated as cylindrical regions with an axis disposed parallel to the fiber core. In other embodiments, other shapes including hexagonal regions and the like can be utilized. In some embodiments, the plurality of sacrificial regions are made using a material that has a higher etch rate than an etch rate of the cladding region. Examples of sacrificial materials in these embodiments include heavily doped glass. In alternative embodiments, the plurality of sacrificial regions can be air cavities. In other alternative embodiments, the sacrificial regions can include solid sacrificial materials, can be air cavities, or combinations thereof.

The method also includes focusing a laser beam at a series of predetermined locations inside the fiber optic cable (412) and creating a series of damage sites associated with the series of predetermined locations (414). The fiber core can be characterized by a longitudinal axis and the method can include rotating the fiber around the longitudinal axis while the series of damage sites are created at the additional predetermined locations.

The series of damage sites define a variable diameter profile (e.g., a tapered profile, a profile that has smaller diameter sections between larger diameter sections, or the like) and a latticework in the cladding region of the fiber optic cable. In addition to or as elements of the latticework, the series of damage sites can define a plurality of radial vias passing through the cladding region towards the fiber core. The series of damage sites can be created by initially forming a first series of damage sites adjacent the fiber core and subsequently forming a second series of damage sites farther from the fiber core so that the laser beam does not have to pass through damaged material as the damage sites are created.

The method further includes exposing the fiber optic cable to an etchant solution (416), preferentially etching the series of damage sites (418), and separating peripheral portions of the fiber optic cable to release the variable diameter fiber (420).

It should be appreciated that the specific steps illustrated in FIG. 4 provide a particular method of fabricating a variable diameter fiber according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 is a simplified side view of a fiber optic cable and a laser ablation beam forming a tapered light emission tip according to an embodiment of the present invention. As illustrated in FIG. 5, rotation (illustrated by angle θ) of the fiber optic cable 525 around the longitudinal axis 510 of the fiber optic cable while the focus point of the laser beam is held constant enables formation of a circular series of damage sites 505 in the cladding of the fiber. As the laser beam is moved longitudinally and focused at greater depths (i.e., closer to the core), a series of damage sites having a tapered profile is formed. The radial dimension at which the damage sites are formed is thus controlled as a function of longitudinal distance.

Figure 6:
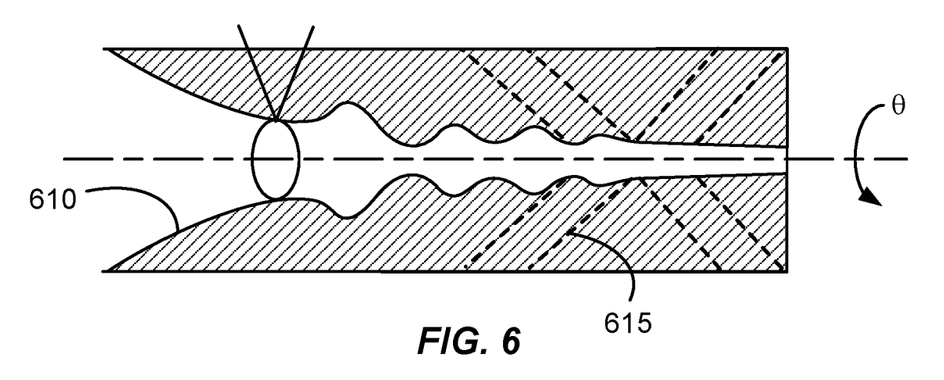
FIG. 6 is a simplified side view of a fiber optic cable and a laser ablation beam forming a predetermined fiber profile according to an embodiment of the present invention.

FIG. 6 is a simplified side view of a fiber optic cable and a laser ablation beam forming a predetermined fiber profile according to an embodiment of the present invention. Referring to FIG. 6, embodiments of the present invention enable fabrication of shaped profiles in which the shape prevents the exterior cladding region from separating from the shaped fiber after etching along the damage sites (assuming no latticework) is completed. In these cases, the latticework illustrated in FIG. 3 enables the etchant to permeate the exterior cladding region along the length of the exterior cladding region, enabling arbitrary shaped profiles to be fabricated.

As illustrated in FIG. 6, a shaped profile 610 with an arbitrary shape with predetermined lateral dimensions other than tapered can be created as the laser is scanned along the longitudinal direction of the fiber. The laser can be scanned multiple times longitudinally using different periods, different depths, etc., forming different damage patterns on each pass to create the overall latticework and lateral dimension shapes as illustrated in FIGS. 3 and 6. Both corkscrew and reverse corkscrew shapes, with differing radiuses and/or periods, can be used to create cross-hatch patterns. In some embodiments, the desired set of damage sites is programmed in a coordinate system and the laser is scanned as the fiber is rotated to generate the desired set of damage sites. Although the latticework illustrated in FIG. 3 is rectangular, this is not required by the present invention and the planes of the latticework can be tilted with respect to the longitudinal direction. In FIG. 6, latticework 615 is tilted at approximately 45 degrees and extends through the cladding to reach the arbitrary shaped profile 610. Funnel shapes are thus provided by the tilted latticework illustrated in FIG. 6. Additionally, helical structures and structures of arbitrary geometry can be created by the methods described herein. Combinations of rectangular latticeworks, tilted latticeworks, helical latticeworks, and/or vias are included within the scope of the present invention.

Figure 7A:
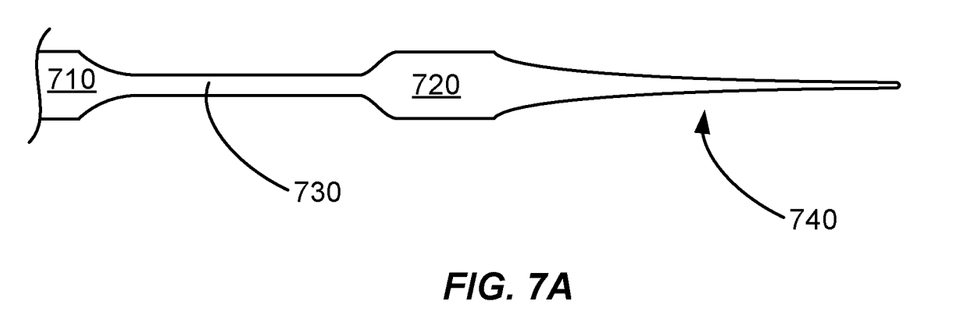
FIG. 7A is a simplified side view of a portion of a shaped fiber according to an embodiment of the present invention.
Figure 7B:
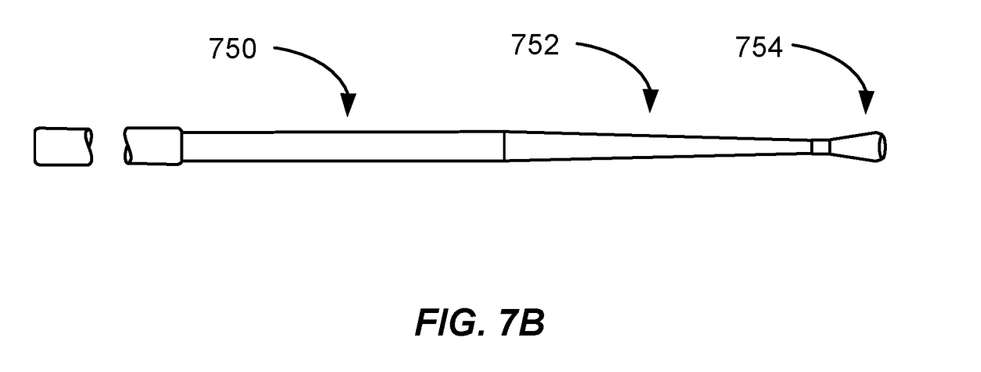
FIG. 7B is a simplified side view of a portion of a shaped fiber according to another embodiment of the present invention.

An exemplary shaped fiber that can be fabricated using the techniques discussed in relation to FIG. 6 is illustrated in FIGS. 7A and 7B. FIG. 7A is a simplified side view of a portion of a shaped fiber according to an embodiment of the present invention. As illustrated in FIG. 7A, the shaped fiber includes two support regions 710 and 720, which can be mechanically connected to support elements, including piezoelectric motion actuators. The shaped fiber also includes a flexure region 730 that is characterized by a smaller diameter than the two support regions. Additionally, the shaped fiber includes a tapered light delivery and emission region 740 that terminates in a fiber tip. Accordingly, the methods described herein are suitable for the fabrication of this shaped fiber with a complex profile.

FIG. 7B is a simplified side view of a portion of a shaped fiber according to another embodiment of the present invention. In FIG. 7B, the shaped fiber includes a constant diameter region 750, a tapered region 752, and a lensed fiber tip 754. The diameter, length, and taper angle can be selected as appropriate to the particular application Although a lensed fiber tip 754 including an expansion region and a curved tip is illustrated, embodiments of the present invention are not limited to this particular implementation. In other embodiments, a ball lens is formed at the end of the shaped fiber. One of ordinary skill in the art would recognize many variations, modifications, and alternatives.

FIG. 8 is a simplified perspective view illustrating drawing of a fiber preform with sacrificial regions according to an embodiment of the present invention. The fiber preform 800 includes a fiber core 805 and fiber cladding 807. One or more sacrificial material sections 810 are distributed throughout the cladding 807. The one or more sacrificial material sections 810 can be accessed by vias passing from the outer surface 820 of the cladding to the sacrificial material sections. The sacrificial material sections include materials that have a higher etch rate than the cladding and/or the core of the fiber. As a result, once the etchant reaches the sacrificial material sections, they are easily etched by HF-based etchants or other suitable etchants.

As examples, sacrificial materials that can be utilized by embodiments of the present invention include heavily doped glass, and the like. Drawing of the fiber is illustrated by decreasing diameter 825 in FIG. 8.

Additionally, in addition to solid materials, the sacrificial material sections may be defined as air cavities built into the preform used to draw the fiber. The use of air cavities effectively removes bulk material, thereby increasing the effective etch rate. Thus, techniques used for photonic-crystal fibers can be utilized to enhance etch rates in accordance with embodiments of the present invention. Vias can be formed that pass from the outer surface of the cladding region to the air cavities used in place of or in combination with sacrificial material sections to enable etchant to reach the air cavities. Additionally, in some embodiments utilizing air cavities, etchant can be introduced into the air cavities from the end of the fiber as well as through vias, providing additional decreases in the etch time. In some embodiments, a combination of air cavities and solid sacrificial materials are utilized. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fabricating a variable diameter fiber, the method comprising:
   providing a fiber optic cable comprising a cladding region, a fiber core, and a plurality of sacrificial regions disposed in the cladding region;
   focusing a laser beam at a series of predetermined locations inside the fiber optic cable;
   creating a series of damage sites associated with the series of predetermined locations, wherein the series of damage sites define:
      a variable diameter profile; and
      a latticework in the cladding region of the fiber optic cable;
   exposing the fiber optic cable to an etchant solution;
   preferentially etching the series of damage sites; and
   separating peripheral portions of the fiber optic cable to release the variable diameter fiber,
   wherein the variable diameter profile comprises a tapered profile.

2. The method of claim 1 wherein the sacrificial regions comprise cylindrical regions with an axis disposed parallel to the fiber core.

3. The method of claim 2 wherein the plurality of sacrificial regions comprise a material having a higher etch rate than an etch rate of the cladding region.

4. The method of claim 2 wherein the plurality of sacrificial regions comprise air cavities.

5. The method of claim 1 wherein creating the series of damage sites associated with the series of predetermined locations comprises forming a plurality of radial vias passing through the cladding region towards the fiber core.

6. The method of claim 1 wherein creating the series of damage sites associated with the series of predetermined locations comprises initially creating a first portion of the series of damage sites adjacent the fiber core and subsequently creating a second portion of the series of damage sites farther from the fiber core.

7. The method of claim 6 wherein the second portion of the series of damage sites is disposed in the cladding region.

8. The method of claim 1 wherein the fiber core is characterized by a longitudinal axis, the method further comprising rotating the fiber optic cable around the longitudinal axis during the creating the series of damage sites associated with the series of predetermined locations.

9. The method of claim 1 wherein focusing the laser beam at the series of predetermined locations introducing astigmatism in the laser beam prior to impingement on the fiber optic cable.

10. The method of claim 9 wherein the astigmatism in the laser beam compensates for cylindrical focusing as the laser beam propagates through the fiber optic cable.

11. The method of claim 9 further comprising adjusting the astigmatism in the laser beam as a function of distance from the series of predetermined locations and the fiber core.

\* \* \* \* \*